3,414,515
COLOR IMPARTING COMPLEXES OF STARCH ETHERS FOR SWIMMING POOLS
Charles L. Mehltretter and William B. Roth, Peoria, Ill., assignors to the United States of America as represented by the Secretary of Agriculture
No Drawing. Filed Oct. 5, 1964, Ser. No. 401,744
1 Claim. (Cl. 210—62)

ABSTRACT OF THE DISCLOSURE

Swimming pools can be disinfected with nonirritant iodine instead of chlorine and at the same time be given a stable, highly attractive green to blue coloration that maskes the expected yellow tint of the uncomplexed excess iodine by using in lieu of chlorine the deeply blue iodine complex of a hydroxyalkyl ether of amylose and of amylose-containing starches having a D.S. of 0.014–0.050 or by forming the said complex in situ.

---

A nonexclusive, irrevocable, royalty-free license in the invention herein described, throughout the world for all purposes of the United States Government, with the power to grant sublicenses for such purposes, is hereby granted to the Government of the United States of America.

The disinfection of swimming pools with free chlorine is practically universal, but chlorine irritates the eyes and, as habitual smokers know, it also affects the sensory receptors of the mouth and nose so that the aroma of a pool-side cigarette seems to be unpleasantly altered. Because dilute aqueous solutions of iodine are germicidal and are essentially non-irritating to the cornea, they have been tried in swimming pools, but the yellowish cast that is particularly noticeable in the deeper areas of the pool is esthetically unacceptable.

It is known that iodine reacts with amylose, the linear component of starch, to form a blue complex whereas iodine reacts with amylopectin, the branched component of starch, to yield a brownish-purple complex.

Because of the 27 percent amylose content of ordinary dent corn starch, and the 50–70 percent amylose content of the recently developed amylomaize hybrid ("high-amylose") corn starches, and the more than 90 percent amylose contents of commercial corn and potato amyloses, iodine gives a blue complex with these polysaccharides when they are dispersed in hot water and the dispersions are cooled.

Such cooled dispersions (see Example 7) contain from 0.2 to 2 percent of amylose in solution which on addition of iodine give the characteristic blue color of the amylose-iodine complex. However, the remaining 98 percent of the starch is insoluble in the dispersion and this predominant residue that is colored blue-black by the iodine settles out. These starches are thus wholly unacceptable for use in swimming pools because of the inefficiency of blue color formation and the settling out of a blue-black sludge. On high dilution the weak blue color given by the very limited proportion of dissolved amylose-iodine complex does not provide an effective masking of the distinctly yellowish iodine color unless an utterly prohibitive amount of the polysaccharide is employed, thereby also requiring immediate filtering to remove the great amount of very rapidly deposited blue-black sludge.

It is obvious that the enormous waste involved in compensating for the negligible solubilities precludes any practical use. Furthermore, even though cooked commercial corn amylose is somewhat more soluble i.e., to the extent of about 2 percent, it is still much too insoluble to provide any practical amount of dissolved polysaccharide-iodine complex for swimming pool use. Our first efforts to increase the water-solubility of starches and amylose by chain-shortening procedures such as dextrinization or by partial depolymerization with enzymes prior to complexing with iodine were of no benefit since the therewith obtained more soluble iodine complexes were distinctly purple and esthetically unusable in swimming pools.

The primary object of our invention is the provision of much more highly soluble ether derivatives of relatively inexpensive polysaccharides, e.g., starches and amylose that will complex with iodine to provide purely blue, potentially antiseptic products that, even when greatly diluted, provide a strong unequivocally blue color that is free of any suggestion of purple or brown components and that also is sufficiently intense even on high dilution to completely mask the distinctly yellowish tint from any disinfecting excess of free iodine remaining after the polysaccharide ether is added to an already iodinated swimming pool. Another object is the provision of ether derivatives of starch and amylose that are soluble in water to the extent of at least about 5 percent and that will not flocculate or settle out. Another object is a method of employing iodine for the disinfection of swimming pools in conjunction with a novel adjunct that substittues an attractive blue color for the unacceptable yellow color of the iodine. Other objects and advantages will appear hereinafter.

In accordance with the objects of our invention we have now discovered that swimming pools can be given a highly desirable green to blue color even in the presence of a disinfecting excess of free iodine with the iodine complexes of certain critically substituted hydroxylalkyl ethers of polysaccharides such as ordinary corn starch containing not less than about 27 percent amylose and not more than about 73 percent amylopectin, "high-amylose" (amylomaize) starches containing up to 70 or more percent of amylose, and the commercial amyloses fractionated from corn or potato starch, the said ethers being those formed by reacting sufficient ethylene oxide or, more preferably, 1,2-propylene oxide, to provide an alkylene oxide D.S. (degree of substitution), preferably in the range of about 0.017 to about 0.035, and not beyond the economically practical and critically operative range of 0.014–0.050 inclusive, since a polysaccharide ether with a D.S. of 0.011 was far too insoluble to provide a dilution-resistant deeply blue color without the use of very large amounts thereof, which formed a heavy sediment at the bottom of the pool whereas, on the other hand, despite a very greatly increased solubility, a hydroxyalkylated polysaccharide ether having a D.S. of 0.065 developed only a very weak blue color with iodine which color all but disappeared on dilution and could not effectively mask the yellow color of the free iodine. While the color characteristics of our iodinated polysaccharide ether compositions make them especially valuable as adjuncts for the esthetic sterilization of swimming pools, it is obvious that our water soluble starch ether-iodine complexes also have utility in preoperative rinses for surgeons and for the sterilization of instruments.

Since the hydroxyalkylated polysaccharides still have relatively limited solubilities and are not immediately dispersed or dissolved from the dry state, it is apparent that for practical swimming pool use the etherified polysaccharide, e.g., that of amylose or of any starch excepting waxy maize starch (100% amylopectin) should be available in the form of at least a 5 to 15 percent aqueous solution or dispersion which can be metered into the pool. If it is desired to form the blue complex in situ, the iodine components in the form of an aqueous solution containing ⅓ proportion of iodine per proportion of potassium iodide can first be metered into the pool and the solution of polysaccharide ether then added thereto, or vice versa.

Other obvious means for introducing free iodine to the pool may also be used.

Although highly hydroxyethylated and hydroxypropylated flours and starches are old, they have not heretofore been reacted with iodine to form usefully colored complexes. Moreover, the inventive concept of providing a nontoxic agent that will acceptably mask the yellow color of a germicidal excess of iodine is believed to be completely novel. In addition, in view of our finding that the etherification of amylopectin does not prevent the formation of a brown color with iodine it is surprising and unobvious that the presence of substantial proportions of amylopectin in the etherified high-amylose starches and the even greater amounts in the ordinary starch ethers does not provide at least a trace of purple instead of the purely blue color that we found to be given with iodine by the ethers of the invention.

In carrying out the well known etherification step, the polysaccharide is homogeneously dispersed in 1 N to 1.25 N sodium hydroxide or potassium hydroxide solution by agitation in an inert atmosphere such as nitrogen and the alkylene epoxide, preferably 1,2-propylene oxide, is added thereto. The strong alkali solution disperses and gelatinizes the polysaccharide and acts as a catalyst for the etherification reaction. The reaction readily occurs at room temeperature, but heat will increase the rate of reaction, and a temperature of about 40° C. is preferred. After completion of the hydroxyalkylation reaction the excess alkali is neutralized, and the viscous, nearly clear dispersion can be diluted with water for subsequent complexing with iodine to produce the desired blue solution. For analytical purposes, the neutralized reaction mixture may then be added to a water miscible organic solvent such as methanol for precipitation of the solid product, followed by filtration and washing with the organic solvent and then drying. The polysaccharide ether may also be prepared in the granule form by known methods but the granular product will require gelatinization with aqueous alkali or hot water, or by hot roll drying in order to provide the required water solubility that is essential for practical operativeness of the invention.

The following examples are set forth to more fully describe our invention.

Example 1

45.0 g. of commercial amylomaize starch ("Amylon VII") were dispersed in 120 ml. of 1.25 N sodium hydroxide and the alkaline dispersion reacted with 4.3 g. of propylene oxide at 40° C. for 3 hours in a nitrogen atmosphere.

The hydroxypropylated starch dispersion was then neutralized with glacial acetic acid to pH 6.4. While stirring, 1 liter of methanol was added to precipitate the hydroxypropylated starch product. After filtration and washing first with methanol and then with acetone, the white product was vacuum dried over calcium chloride for 24 hours at room temperature and then at 114° C. for 2 hours. Yield: 33.8 grams. Analysis: 1.27% hydroxypropyl (D.S. 0.035).

The product was soluble to an extent of 10 percent in hot water and remained dissolved on cooling to 25° C.

Using the above procedure with varying quantities of propylene oxide, hydroxypropylated amylomaize starches having the following D.S. values were obtained: 0.011, 0.017, 0.050.

Example 2

45.0 g. (40.5 g. dry basis) of amylomaize starch ("Amylon VII") were dispersed in 120 ml. of 1.25 N sodium hydroxide solution and reacted with 4.3 g. of propylene oxide at 40° C. for 3 hours in a nitrogen atmosphere. The hydroxypropylated starch dispersion was diluted with about 700 ml. of water and neutralized to pH 6.3 with hydrochloric acid. Total weight of the solution was 957 g. containing 4.25 weight percent of hydroxypropyl starch.

To 95.7 g. of solution (4.0 g. hydroxypropylated "Amylon VII") were added 20 ml. of an aqueous solution containing 0.8 g. of free iodine and 4 g. of potassium iodide. For analytical purposes, the resulting darkly blue hydroxypropyl starch iodine complex was treated with 100 ml. of methanol, centrifuged out, washed twice with 100 ml. portions of 50-percent methanol and then twice with 100 ml. portions of absolute methanol with intermediate centrifugation. The blue-black solid product was air dried at 40° C. and weighed 4.0 grams. Analysis: I, 10.9%.

Example 3

Using the conditions of Example 1 but employing potato amylose ("Superlose") in place of the "Amylon VII," hydroxypropyl D.S. values of 0.027 and 0.031 were obtained.

Example 4

To 48 ml. of water containing 2.5 g. of dissolved hydroxypropylated amylose (D.S. 0.031 of Example 3) were added 20 ml. of an aqueous solution containing 0.8 g. of iodine and 4 g. of potassium iodide. The intensely blue mixture was stirred for 15 minutes and then precipitated with 50 ml. of ethanol. The hydroxypropyl amylose-iodine complex was separated by centrifugation. It was washed twice by addition of 50 ml. of ethanol with intermediate centrifugation. For analytical purposes only, the blue-black solid product was dried at 40° C., it weighed 3.1 g., and analyzed 11.07 percent iodine.

Example 5

Using the conditions of Example 1 but substituting corn amylose ("Nepol") for the starch, hydroxypropyl D.S. values of 0.017 and 0.034 were obtained.

Example 6

To provide a practical test of our invention, 13 pounds (approximately 52 p.p.m.) of a 5 percent solution of hydroxypropylated amylose (D.S. 0.034) were added to a pool holding about 30,000 gallons of water containing 0.8 pounds of free iodine and 2.3 pounds of potassium iodide. A pleasing light blue coloration gradually replaced the objectionable yellow cast of the free iodine.

Example 7

Respective 5.0 gram portions of the unetherified commercial starch products were heated in 95 g. portions of distilled water at 100° C. for 30 minutes with stirring. The solutions were then cooled and centrifuged and the solubilities determined by evaporating an aliquot of each supernatant liquor to dryness. The low water solubilities of these starches are shown in Table I. Waxy corn starch is soluble at 5 percent in hot water.

In contrast, all of the hydroxypropyl starches, excepting hydrdoxypropyl "Amylon VII" of D.S. 0.011, dissolved completely under the same conditions. The higher D.S. hydroxypropyl starches in fact dissolved to extents of up to 15 percent in hot water and remained dissolved on cooling to 25° C.

TABLE I.—WATER SOLUBILITY OF THE UNETHERIFIED STARCHES

| Product | Amylose content, percent | Solubility, weight percent |
|---|---|---|
| "Superlose" [1] | 90 | 0.53 |
| "Nepol" [2] | 90 | 2.00 |
| "Amylon VII" [3] | 73 | 0.33 |
| Corn starch | 27 | 0.23 |

[1] Potato amylose (Stein-Hall Co.)
[2] Corn amylose (A.E. Staley Mfg. Co.).
[3] Amylomaize starch (National Starch and Chemical Corp.).

Example 8

Table II illustrates the efficiency of blue color formation of the hydroxypropylated starches of D.S. 0.017–0.035. It indicates the requirement that there be etherified constituent amylose and also shows that the D.S. range of 0.017 to 0.035 is critical for the formation of a purely blue color with iodine when the solutions of etherified carbohydrates are added to 4 liters of water containing 2 ml. of 0.1 N I and 4 ml. of 0.1 N KI.

TABLE II.—COLOR FORMATION BY ADDITION OF 5% AQUEOUS SOLUTIONS OF HYDROXYPROPYLATED STARCHES TO THE IODINE-POTASSIUM IODIDE SOLUTIONS

| Product | D.S. | Ml. 5% soln. | Color |
|---|---|---|---|
| Hydroxypropyl "Superlose" | 0.031 | 0.2 | Light blue. |
| Hydroxypropyl "Nepol" | 0.034 | 0.5 | Do. |
| Hydroxypropyl "Amylon VII" | 0.017 | 0.4 | Do. |
| Do | 0.035 | 0.5 | Do. |
| Do | 0.035 | 0.5 | Do. |
| Do | 0.050 | 9.0 | Brown-blue. |
| Do | 0.050 | 0.5 | Yellow color of iodine remains unchanged. |
| Hydroxypropyl corn starch (27% amylose) | 0.024 | 0.8 | Light blue. |

Example 9

Using the conditions of Example 1 but substituting ordinary corn starch containing 27 percent amylose in place of the "Amylon VII" (amylomaize) starch of Example 1, corn starch having a hydroxypropyl D.S. of 0.024 was obtained. For determining the iodine complexing power of the hydroxypropylated corn starch 20 ml. of water having dissolved therein 0.8 g. of iodine and 1.0 g. of KI were then added to 80 ml. of water containing 2.5 g. of dissolved hydroxypropyl corn starch. After stirring for 15 minutes, 80 ml. of ethanol was added to precipitate the starch ether iodine complex. After continuing the stirring for 15 minutes and centrifuging, the blue-black residue was washed with 50 ml. of ethanol, centrifuged; rewashed in the same manner and recentrifuged to provide a recovery of 2.8 g. of complex that analyzed 6.2 percent iodine.

We claim:
1. A process for permitting the esthetically acceptable use of iodine for the disinfection and masking of iodine color of swimming pool water comprising adding, to the water containing a mixture consisting of a sterilizing excess of free iodine and a weight of potassium iodide 5 times the weight of the said free iodine about 52 p.p.m. of an aqueous solution containing at least about 5 percent by weight of a hydroxyalkyl ether of a polysaccharide selected from the group consisting of ordinary corn starch, high amylose corn starch, corn amylose, and potato amylose, the hydroxyalkyl D.S. of the polysaccharide being confined to the range of 0.017–0.035.

References Cited

UNITED STATES PATENTS

| 2,022,729 | 12/1935 | Malisoff | 252—313 |
| 2,137,169 | 11/1938 | Levey | 167—84 |
| 2,733,238 | 1/1956 | Kerr et al. | 260—233.3 |
| 3,122,534 | 2/1964 | Muetgeert et al. | 260—209 |

OTHER REFERENCES

Lampitt et al., J.S.C.I., vol. 66, May 1947, pp. 142–147.

Treadwell, Analytical Chemistry, vol. II, 1911, pp. 652–654, John Wiley and Sons.

MORRIS O. WOLK, *Primary Examiner.*

F. T. RUDIAK, *Assistant Examiner.*